UNITED STATES PATENT OFFICE.

CARL KELLNER, OF VIENNA, AUSTRIA-HUNGARY.

PROCESS OF MANUFACTURING INCANDESCENT BODIES.

SPECIFICATION forming part of Letters Patent No. 661,610, dated November 13, 1900.

Application filed March 23, 1899. Serial No. 710,238. (No specimens.)

*To all whom it may concern:*

Be it known that I, CARL KELLNER, a subject of the Emperor of Austria, residing at Vienna, in the Province of Lower Austria, in the Empire of Austria-Hungary, have invented certain new and useful Improvements in Incandescent Bodies for Incandescent Electric Lamps and in the Process of Manufacturing the Same; and I do hereby declare the following to be a full, clear, and exact description of the invention, such as will enable others skilled in the art to which it appertains to make and use the same.

In the heretofore-used incandescent bodies (carbon filaments) of electric incandescent lamps only a small part of the energy supplied in the form of electricity is converted into light, the greater portion being lost in the form of heat. The cause of this is that such filaments which are made of amorphous carbon cannot be heated to an intense white heat, as they would then be quickly destroyed, the conversion of the amorphous carbon into graphite of increased density, which takes place at white heat, altering the molecular structure of the filaments. I have found that this alteration also takes place in the ordinary use of incandescent lamps, but in a gradual manner, the filament, which is converted by the ordinary glowing partly into a graphite-like modification of carbon, being converted by the continued use of the lamp into denser graphite, with the result that the filament breaks.

Many attempts have been made to discover a better and more durable incandescent body for incandescent electric lamps, and it has been recognized that only those bodies that fuse with the most difficulty are suitable for the purpose. No satisfactory practical result, however, has heretofore been obtained, because either too good conductors of electricity have been tried, in which the resistance necessary for producing white heat cannot be reached, or because in incandescent bodies which are made of mixtures of conductors and non-conductors (or conductors of the second class) binding or fusing agents have been employed which in use have been continuously altered by the electric current, or, finally, because the bodies in order to effect their object have first had to be heated in a tedious manner to that temperature at which they become conducting.

Incandescent bodies according to the present invention enable the greatest portion of the electric energy supplied to be converted into light, because they can be raised by the electric current to the brightest white heat without becoming deteriorated. These incandescent bodies consist of infusible metals, which are not very good conductors of electricity and which have a high capacity for emitting light, such as thorium, or of almost infusible metals, such as titanium, (in the form of pure titanium or nitrid of titanium,) chromium, or wolfram, or alloys of such metals, incandescent bodies made of these infusible or almost infusible metals or alloys being oxidized at their surfaces, or of mixtures of (a) almost infusible metals or alloys of the same, or (b) graphite of the kind which offers the very greatest resistance to conversion into graphite acid by potassium chlorate and nitric acid (graphite of high density up to 2.25 specific gravity) with metallic oxids that are infusible or are fusible with difficulty and capable of emitting light, such as thorium oxid, with or without an addition of cerium oxid.

Incandescent bodies of the kind referred to have the advantage (since they possess a relatively small conductivity) that they can be made in convenient dimensions without being liable to break too easily.

The manufacture of incandescent bodies is effected according to this invention by molding the metals of the kind referred to or the mixtures of the difficultly-fusible metals or alloys or graphite of the kind stated with metallic oxids fusible with difficulty and capable of emitting light in a state of fine powder and without the addition of a binding or fusing agent into solid bodies under high pressure. For this purpose the dry powder is placed in a press-mold and by means of a suitably-formed plunger a considerable pressure (up to twenty thousand kilograms per square centimeter) is exerted upon it.

When the bodies are made of thorium metal or of metals fusible with difficulty—such as titanium, chromium, or wolfram, or alloys of such metals alone—they are oxidized at their surfaces by being made to glow in the air by immersion in an oxidizing liquid or by being inserted as an anode in an electric circuit, which decomposes an electrolyte of which oxygen is the anion or by any other suitable means. The thin layer of oxid adheres so firmly to the metal that it is not damaged when the incandescent body is used.

When the incandescent body is to consist of a mixture of graphite of high density with metallic oxids, it may be made by molding and pressing a mixture consisting of powdered metallic oxids capable of emitting light and of a small addition of cellulose soaked in chlorid of zinc. After glowing in a vacuum or in a neutral gas, such as nitrogen, the body is subjected to a current of high potential for the purpose of converting the amorphous carbon into graphite of high density before the incandescent body is put into use. Disintegration of the body during the conversion of the carbon into graphite is not to be feared, because the small quantity of the latter (at most five per cent.) is inclosed by the particles of metallic oxid.

In order to prevent the incandescent bodies of the kind described from being damaged when in use by excessive heating at the parts where the current is supplied to them—viz., at the places of contact—it is advisable to strengthen them at such parts—that is to say, to make them thicker—and to mold the leading-in wires into the mass of the incandescent bodies when the latter are being molded or to fuse the said wires into the said strengthened parts by means of the electric arc.

I claim—

1. The improvement in the manufacture of incandescible bodies, which consists in dry-molding into the desired shape an infusible or substantially infusible metal of inferior conductive and high illuminating power and then surface-oxidizing the body so obtained, for the purpose set forth.

2. An incandescible body consisting of an infusible or substantially infusible metal of inferior conductive and high illuminating power and having its surface coated with an oxid of said metal or metals, for the purpose set forth.

3. An incandescible body made of a mixture of nitrid of titanium and high-resistance refractory oxids, substantially as set forth.

4. The manufacture of incandescible bodies which consists in forming such bodies of alloys of high-resistance metals and surface-oxidizing the completed body, substantially as described.

5. The manufacture of incandescible bodies which consists in forming the same of a mixture of refractory oxids, cellulose and chlorid of zinc, drying and flashing, substantially as described.

In testimony that I claim the foregoing as my invention I have signed my name in presence of two subscribing witnesses.

CARL KELLNER.

Witnesses:
ALVESTO S. HOGUE,
AUGUST FUGGER.